J. EISHEN, Jr.
KETTLE TILTER.
APPLICATION FILED JULY 24, 1912.

1,058,569.

Patented Apr. 8, 1913.

WITNESSES
H. J. Walker
Wm. F. Nickel

INVENTOR
John Eishen Jr.
BY
ATTORNEYS

UNITED STATES PATENT OFFICE.

JOHN EISHEN, JR., OF KELLOGG, MINNESOTA.

KETTLE-TILTER.

1,058,569.     Specification of Letters Patent.     Patented Apr. 8, 1913.

Application filed July 24, 1912. Serial No. 711,215.

*To all whom it may concern:*

Be it known that I, JOHN EISHEN, Jr., a citizen of the United States, and a resident of Kellogg, in the county of Wabasha and State of Minnesota, have invented a new and Improved Kettle-Tilter, of which the following is a full, clear, and exact description.

My invention is an improvement in means for tilting kettles and other vessels to facilitate the operation of emptying the same, and my object is to produce a device of this sort so constructed that by the use thereof an ordinary kettle or other vessel having a lid may be readily and easily tilted and the contents discharged with but one hand and without danger of ever dropping or scalding in case the contents of the vessel to be drained are in heated condition.

Reference is to be had to the accompanying drawings forming a part of this specification, in which the same characters of reference indicate the same parts in both views.

Figure 1:
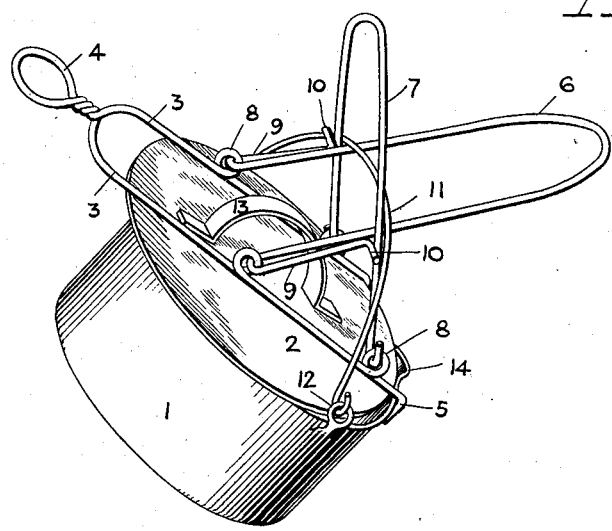
Figure 2:
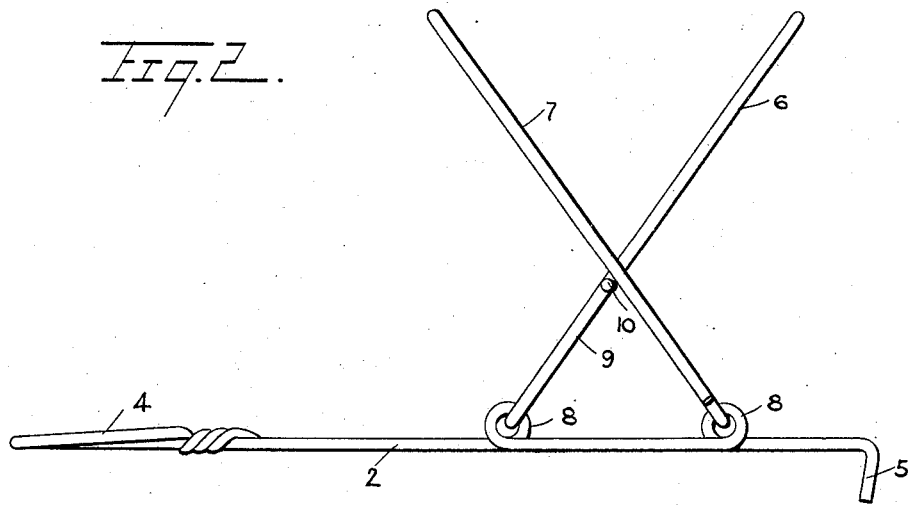

Figure 1 is a perspective view of my tilter, showing the same in position; and Fig. 2 is a side elevation of the same.

On the drawings, the numeral 1 represents a kettle or other vessel provided with a lid 2, and my improved tilter is adapted to be applied to the top of such a vessel to drain the contents therefrom without entirely displacing this lid from the open top of the vessel. The tilter comprises a U-shaped member having arms 3, this U-shaped member being preferably formed of a single piece of wire having a portion connecting the arms 3, twisted to form an eyelet or handle 4, and having the outer ends bent to form hooks shown at 5.

6 and 7 are bails pivotally connected to the arms 3 by means of eyelets 8, and the bail 6, which is secured to the arms 3 nearer to the eyelet or handle 4 than the bail 7, has its ends passed through the loops and then bent back along the sides of the bail 6, and then outward to form projections 10. The bail 6 is designed to pass through the bail 7, and the projections 10 to engage the arms of this bail, as shown in Fig. 1.

Normally, when the tilter is not required for use the bails 6 and 7 will lie in substantially the same plane with the U-shaped member, the bail 6 extending toward the hooks 5 and the bail 7 toward the handle 4. When it is desired to empty the kettle or other vessel the tilter can be laid across the top of the vessel without the lid 2 being removed, and brought into such position that the hooks 5 will engage the edge of the vessel 1. The vessel is provided with a bail or handle shown at 11, and this bail or handle will be held up and the tilter slipped under it and between the same and the lid when it is put in position. The bail 6 will then be raised and the projections 10 will engage the bail 7 and lift this bail with it as far as the bail 11 will permit. To lift the kettle in order to tilt the same it is then only necessary to grasp the tilter by the handle 4 and bail 6 and swing the same into an inclined position. At this time the cooking vessel 1 will be engaged at four points, namely, the points where the hooks 5 come in contact with the rim of the vessel, and the points where the bail 11 rests in the crotch formed by the bails 6 and 7. This manner of engagement effectually prevents the kettle from swinging, as will be readily perceived. Ordinarily, the bails 6 and 7 and the portions 9 with the out-turned projections 10 will be designed so that when these bails engage the bail or handle 11 the arms 3 will be forced to lie flat along the lid 2. The bail 11 will thus be compelled to lie in a plane which is substantially normal with the plane of the lid 2, and the tilter and the vessel 1 will be practically rigid with respect to each other at all points.

As stated above, it will not be necessary to remove the lid 2 in order to drain the kettle or other vessel, although this lid may be removed if so desired. All that is needed is to pull the lid back a piece by the handle 13 from the discharge spout of the kettle shown at 14, so as to leave sufficient space for the liquid contents to run out.

My invention is especially useful in kitchens and other places where cooking is done, to drain away the water from vegetables and the like in the vessels in which the same have been cooked. It is very easy to handle and only necessary to be held by one hand when the same is to be used. At the same time, it supports the kettle from which the liquid contents are being drained, without any danger of the same being dropped or the hand that holds the tilter being scalded or burned.

I wish to have it understood that the above description taken in connection with the accompanying drawings is illustrative only, and that I do not care to be limited to the exact details herein shown and described, but wish to reserve to myself the right to make any changes in the shape, size and arrangement of the parts that fairly fall within the scope and spirit of my invention.

Having thus described my invention, I claim as new and desire to secure by Letters Patent:

1. In an improvement of the kind described, a U-shaped member having a handle at one end and having its ends bent to form hooks to engage the rim of a vessel, the contents of which are to be emptied, a bail pivotally connected to the arms of said U-shaped member near the hooked ends thereof, and a second bail pivotally connected to the arms of said U-shaped member near the handle thereof, said second bail having projections extending outward from its sides in the plane of the second bail to engage the first bail.

2. In an improvement of the kind described, a U-shaped member having the ends of its arms bent to form hooks to engage the rim of a vessel to be emptied, a bail pivotally connected to said arms near said hooked ends, and a second bail pivotally connected to said arms near the handle, the ends of said bail being bent back upon themselves and then outward in the plane of the second bail to form projections, said second-named bail passing through the first bail and said projections engaging the first bail to make the said bails rigid with each other to hold the handle of said vessel.

In testimony whereof I have signed my name to this specification in the presence of two subscribing witnesses.

JOHN EISHEN, Jr.

Witnesses:
 DENNIS McFALLAN,
 JOHN M. WOLFE.

---

Copies of this patent may be obtained for five cents each, by addressing the "Commissioner of Patents, Washington, D. C."